(12) United States Patent
Ivenz et al.

(10) Patent No.: US 8,662,238 B2
(45) Date of Patent: Mar. 4, 2014

(54) MOTOR VEHICLE COMPRISING A SAFETY DEVICE

(71) Applicant: Bayerische Motoren Werke Aktiengesellschaft, Munich (DE)

(72) Inventors: Udo Ivenz, Gablingen (DE); Ulrich Koestler, Hebertshausen (DE); Walter Meierhofer, Schmidham (DE); Nadine Krebs, Wiesen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 13/856,833

(22) Filed: Apr. 4, 2013

(65) Prior Publication Data

US 2013/0221647 A1 Aug. 29, 2013

Related U.S. Application Data

(63) Continuation of application No. PCT/EP2011/066751, filed on Sep. 27, 2011.

(30) Foreign Application Priority Data

Oct. 5, 2010 (DE) .......................... 10 2010 041 965

(51) Int. Cl.
*B60R 21/34* (2011.01)
*B60R 21/36* (2011.01)
*B60R 21/06* (2006.01)
*B60K 28/14* (2006.01)

(52) U.S. Cl.
USPC .............................. 180/274; 180/271; 280/749

(58) Field of Classification Search
USPC .................................... 180/271, 274; 280/749
See application file for complete search history.

(56) References Cited

U.S. PATENT DOCUMENTS

| 3,741,583 A | 6/1973 | Usui et al. |
| 5,318,145 A | 6/1994 | Vollmer |

(Continued)

FOREIGN PATENT DOCUMENTS

| DE | 2 131 479 A | 1/1972 |
| DE | 100 59 223 A1 | 7/2002 |

(Continued)

OTHER PUBLICATIONS

Machine translation of DE10059224.*

(Continued)

*Primary Examiner* — Drew Brown
*Assistant Examiner* — Barry Gooden, Jr.
(74) *Attorney, Agent, or Firm* — Crowell & Moring LLP

(57) ABSTRACT

A motor vehicle having a safety device for protecting pedestrians or bicyclists that collide with the motor vehicle includes an airbag which, in the non-activated basic state, is arranged folded together on an automotive body and, in the activated deployed state, at least partially covers a frame around the windshield. In the activated state, the airbag stretches out a windshield cover in front of the windshield. The cover has a region in which a plurality of energy dissipators are distributed on the side of the cover facing the windshield. During an impact with a person's head, the region is pressed against the windshield. The energy dissipators cause prior damage to the windshield, such that the rigidity of the windshield in this region is reduced. The windshield thus yields upon impact of the head in the region.

20 Claims, 3 Drawing Sheets

(56) References Cited

U.S. PATENT DOCUMENTS

| | | | | |
|---|---|---|---|---|
| 5,439,247 | A | * | 8/1995 | Kolb .................. 280/730.2 |
| 5,729,195 | A | * | 3/1998 | Kang .................. 340/436 |
| 6,467,563 | B1 | * | 10/2002 | Ryan et al. .................. 180/274 |
| 6,497,302 | B2 | * | 12/2002 | Ryan .................. 180/274 |
| 6,955,238 | B2 | | 10/2005 | Takimoto |
| 7,326,454 | B2 | | 2/2008 | Kraemling et al. |
| 7,390,014 | B2 | * | 6/2008 | Takimoto .................. 280/730.1 |
| 2003/0178239 | A1 | * | 9/2003 | Takimoto .................. 180/274 |
| 2003/0227192 | A1 | | 12/2003 | Okamoto et al. |
| 2004/0232663 | A1 | * | 11/2004 | Takimoto .................. 280/730.1 |
| 2005/0098372 | A1 | * | 5/2005 | Takimoto .................. 180/274 |
| 2006/0201731 | A1 | * | 9/2006 | Nakamura .................. 180/274 |

FOREIGN PATENT DOCUMENTS

| | | |
|---|---|---|
| DE | 100 59 224 A1 | 7/2002 |
| DE | 101 02 597 A1 | 9/2002 |
| DE | 102 25 555 B3 | 2/2004 |
| DE | 10 2006 028 484 A1 | 12/2007 |
| DE | 603 15 210 T2 | 4/2008 |
| JP | 2000-264146 A | 9/2000 |

OTHER PUBLICATIONS

International Search Report dated Dec. 14, 2011 with English translation (four (4) pages).

German Search Report dated Jul. 5, 2011 with English translation (ten (10) pages).

* cited by examiner

MOTOR VEHICLE COMPRISING A SAFETY DEVICE

CROSS REFERENCE TO RELATED APPLICATIONS

This application is a continuation of PCT International Application No. PCT/EP2011/066751, filed Sep. 27, 2011, which claims priority under 35 U.S.C. §119 from German Patent Application No. DE 10 2010 041 965.6, filed Oct. 5, 2010, the entire disclosures of which are herein expressly incorporated by reference.

BACKGROUND AND SUMMARY OF THE INVENTION

The invention relates to a motor vehicle comprising a safety device for protecting pedestrians or bicyclists colliding with the motor vehicle, wherein the safety device includes at lease one airbag, which is arranged on the vehicle body in such a way that in the non-activated basic state the airbag is folded up and in the activated unfolded state, at least partially covers a frame around the windshield.

DE 100 59 224 A1 discloses a safety device that is configured for a motor vehicle for protecting pedestrians and has an airbag. The airbag is disposed on the vehicle body in such a way that it is folded up in the non-activated state; and in the activated, unfolded state, the airbag covers a frame around the windshield. To this end, the airbag can be made in a shape that resembles a ring or a U, so that in the activated state the airbag always covers the "A" pillars of the motor vehicle.

In addition, the safety device known from the prior art has a windshield cover, which is stretched in front of the windshield by the airbag in the inflated state. Because of this windshield cover an advantageous energy absorption can occur to some extent in the central region of the windshield, so that any impact in this central region is less hard. The windshield cover can be made of a transparent material. If desired, an additional protective layer can be applied to the underside of the windshield cover.

The trend over the past years has been to strengthen the future maximum allowable acceleration values for an impact of the head of a pedestrian or bicyclist on the windshield. Numerous tests have shown that the rigidity of windshields can deviate widely, so that under some circumstances it is possible for individual windshields to exceed the future maximum allowable acceleration values upon a head impact.

The object of the present invention is to provide a motor vehicle with a safety device that guarantees—during a collision of the motor vehicle with a pedestrian or bicyclist—that the acceleration values of the head and, as a result, the potential head injuries, will be as low as possible upon impact of the head of the pedestrian or bicyclist on a windshield of the motor vehicle.

This and other engineering objects are achieved according to the invention with a motor vehicle comprising a safety device for protecting persons, such as pedestrians or bicyclists, that collide with the motor vehicle. The safety device comprises at least one airbag, which is arranged on the vehicle body in such a way that in the non-activated basic state the airbag is folded up and, in the activated (deployed) unfolded state, at least partially covers a frame around the windshield. In the activated, unfolded state the airbag spans a windshield cover in front of the windshield. The windshield cover has at least one region, in which a plurality of energy dissipators are distributed on the side of the windshield cover that faces the windshield. When a pedestrian or bicyclist hits his head on this region, the region is pressed against the windshield. At the same time, the energy dissipators cause prior damage to the windshield, so that the rigidity of the windshield in the region is reduced. As a result, the windshield gives way in a repeatable fashion when a head collides with this region. The head acceleration values are lower than in the case of a windshield that has not experienced prior damage.

In the activated, unfolded state the airbag covers a frame around the windshield. This frame-like shape is necessary in order to be able to stretch the windshield cover in front of the windshield. For this purpose, the airbag can surround circumferentially the entire windshield in the form of a ring. The airbag covers at least partially, or totally, in an advantageous manner the "A" pillars as the lateral boundary of the windshield and a bottom wind deflector as the lower boundary of the windshield. These are the regions of the motor vehicle that are especially unyielding. In order to cover these regions and to stretch the windshield cover, it is sufficient in a convenient way if the airbag is constructed in the shape of a U. The smaller the airbag, the less space it requires in the non-activated basic state, in which it is folded up; and, hence, the faster it can be inflated.

The windshield cover can consist preferably of a net or a foil. The foil is made ideally of a transparent material. In this way it is possible that the driver of the motor vehicle can still see the road lane through the transparent windshield cover with the activated airbag, even after a collision with a pedestrian or bicyclist and, if desired, can bring the motor vehicle to a standstill in a controlled manner. As an alternative, the windshield cover can also be made of the same woven fabric from which the cover of the airbag is made. In this case the central region has either a recess or a plurality of holes, through which the driver can still see the road lane at least to some extent.

The function of the energy dissipators, which are affixed to the windshield cover, is to cause prior damage to the windshield, when they are pressed against the windshield owing to the head crashing against the windshield cover. Energy dissipators that lend themselves especially well to this purpose are granular material. In this context, it is advantageous if each of the grains has at least one sharp corner and/or edge. When these corners and/or edges of the energy dissipators are pressed against the windshield, they can cause substantial damage to the windshield and, thus, intensify the desired effect.

Grains that have proven to be particularly suited are grains having a diameter between 0.5 mm and 2.5 mm. If the grains are too large, there is the risk that the impacting head will be injured on the grains; if the grains are too small, the windshield would experience too little prior damage under some circumstances. Suitable granular material includes both grains made of a natural occurring abrasive grain material, such as quartz, corundum or a lubricating gel, and grains made of a man-made abrasive grain material, such as a hard plastic or a metal. It is important that the grains exhibit adequate hardness in order to be able to cause considerable prior damage to the windshield. The windshield cover can also include a plurality of embedded wires. Then, the energy dissipators are formed by two intersecting wires.

The hard energy dissipators are conveniently embedded in a protective body made of a soft material. In this way it can be ensured that the windshield is not already damaged in the process of unfolding the airbag, but rather exclusively when a pedestrian or bicyclist actually crashes against the windshield cover. In this case the at least one energy dissipator is pressed through the respective protective body against the windshield and then causes prior damage to the windshield. As a result, the stretched windshield cover does not have to exhibit a minimum distance from the windshield in order to avoid damaging the windshield with the energy dissipators in the event that the airbag opens up unintentionally.

The energy dissipators are affixed in an advantageous way to the windshield cover at regular intervals to each other. In this way it can be guaranteed that the windshield cover is always pressed with the energy dissipators against the windshield independently of the exact location at which the head crashes against the windshield cover. In this case it has turned out to be particularly suitable to space the energy dissipators approximately 1 to 4 cm apart from each other.

According to an especially advantageous embodiment, the distribution of the energy dissipators is chosen in such a way that when the windshield cover is stretched, the regions of the windshield cover, which come to rest in front of the particularly rigid regions of the windshield, exhibit a very large number of energy dissipators. In this way it is possible that in the event of an impacting head of a pedestrian or bicyclist all of the regions of the windshield exhibit approximately the same acceleration values.

In most modern motor vehicles the windshield has a rigidity that is too high under some circumstances, especially in the peripheral regions. Therefore, a plurality of energy dissipators are affixed on the side of the windshield cover that faces the windshield in such a way that they are distributed preferably at least in the peripheral region of the windshield cover.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
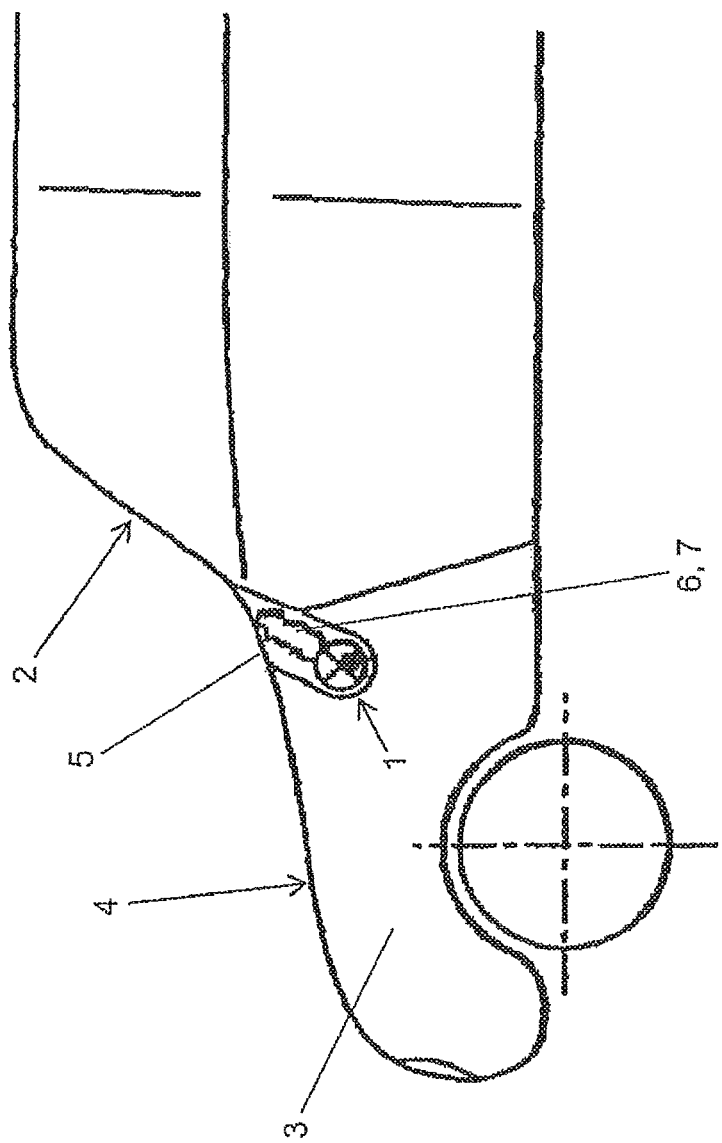
FIG. 1 is a side view of a motor vehicle with an exemplary safety device according to the invention.

FIG. 1 shows a motor vehicle with a safety device 1 in the non-activated basic state. The safety device 1 is disposed underneath a windshield 2 of the motor vehicle in the area of a water tank. In the basic state the safety device 1 is not visible from the outside on the motor vehicle, because it is covered on the side by fenders 3 and at the top by a front hood 4. Between the front hood 4 and the windshield 2 there is a small gap 5.

The safety device 1 consists, in essence, of an airbag 6, an airbag generator and a windshield cover 7. In the non-activated basic state the folded-up airbag 6 and the folded-up windshield cover 7, both of which are not visible from outside the vehicle, are located underneath the windshield 2 in the region of the water tank, as shown in FIG. 1.

Figure 2:
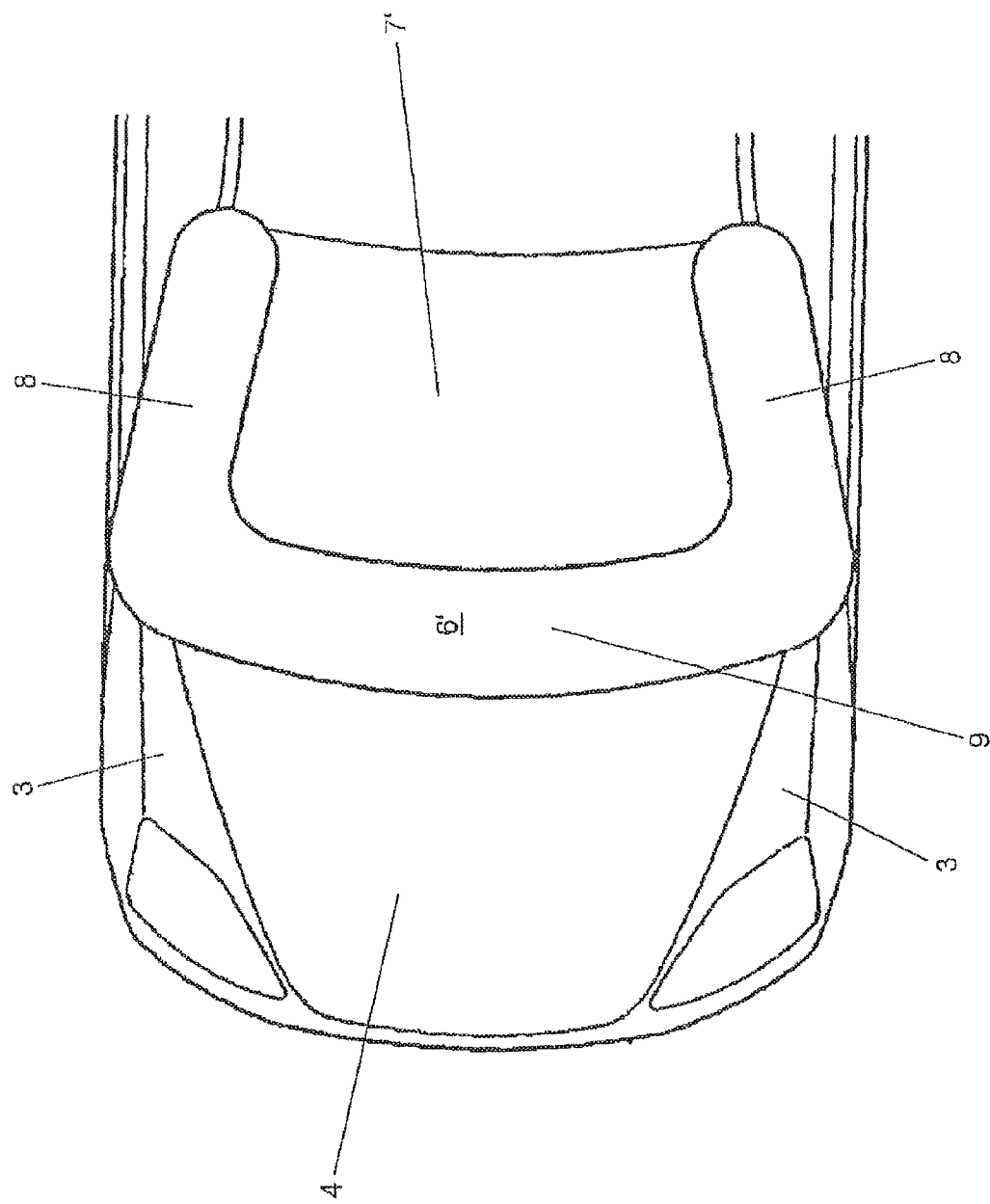
FIG. 2 is a top view of the motor vehicle, which is depicted in FIG. 1, with an activated airbag.

If at this point a collision with a person, such as a pedestrian or bicyclist, is detected, then a control unit activates the airbag generator. The airbag generator rapidly fills the airbag 6 with gas. At the same time, the airbag 6 unfolds through the gap 5 between the front hood 4 and the windshield 2. The activated, unfolded airbag 6' has, as shown in FIG. 2, a shape that resembles a U. In this case the two free legs 8 of the U-shaped airbag 6' come to rest in front of the "A" pillars of the motor vehicle and cover the "A" pillars. The connecting leg 9 of the airbag 6', which connects the two free legs 8 to each other, comes to rest in front of the bottom wind deflector, which forms the lower boundary of the windshield 2. Both the "A" pillars and the bottom wind deflector are bearing structural components of the body of the motor vehicle. Correspondingly, they exhibit a high rigidity and represent a high risk of injury for an impacting pedestrian or bicyclist. At this point, these regions are covered by the activated, unfolded airbag 6', so that a pedestrian or bicyclist cannot collide with the "A" pillar or the bottom wind deflector. Rather, the impact of the person, such as the pedestrian or the bicyclist, is intercepted by the airbag 6', so that the risk of injury to the person is lower.

Figure 3:
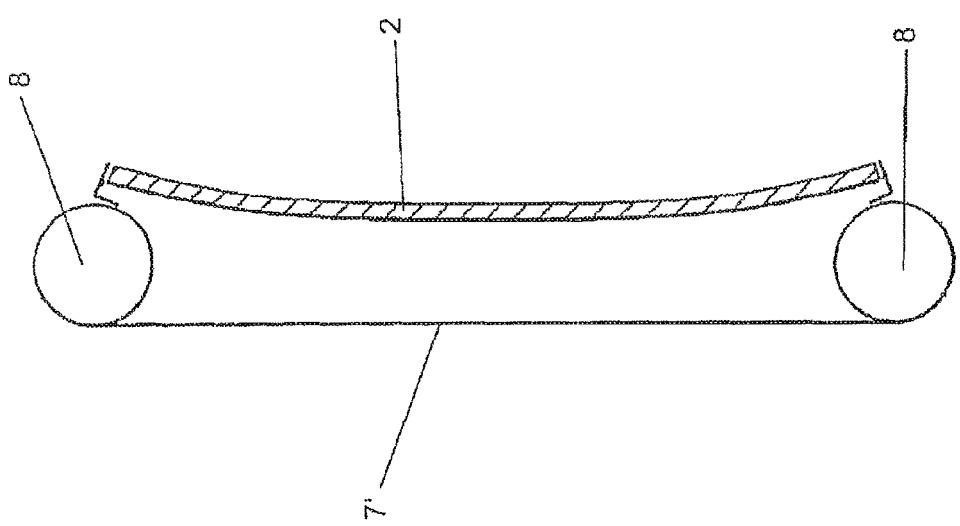
FIG. 3 is a view from above through the windshield of the motor vehicle, depicted in FIG. 2.

The windshield cover 7 (unfolded state in FIG. 1) is connected to the free legs 8 and to the connecting leg 9. The unfolded airbag 6' forms a type of frame for the unfolded windshield cover 7' (see FIGS. 2 and 3). This frame stretches out the windshield cover 7' in front of the windshield 2. In this context the windshield cover 7' is spaced at a distance from the windshield 2, a feature that can be seen best in the sectional view of FIG. 3. This distance of, for example, approximately 10 cm to 20 cm enables the windshield cover 7' to absorb a small portion of the impact energy of the person, before the person collides against the windshield 2 in the central region.

Figure 4:
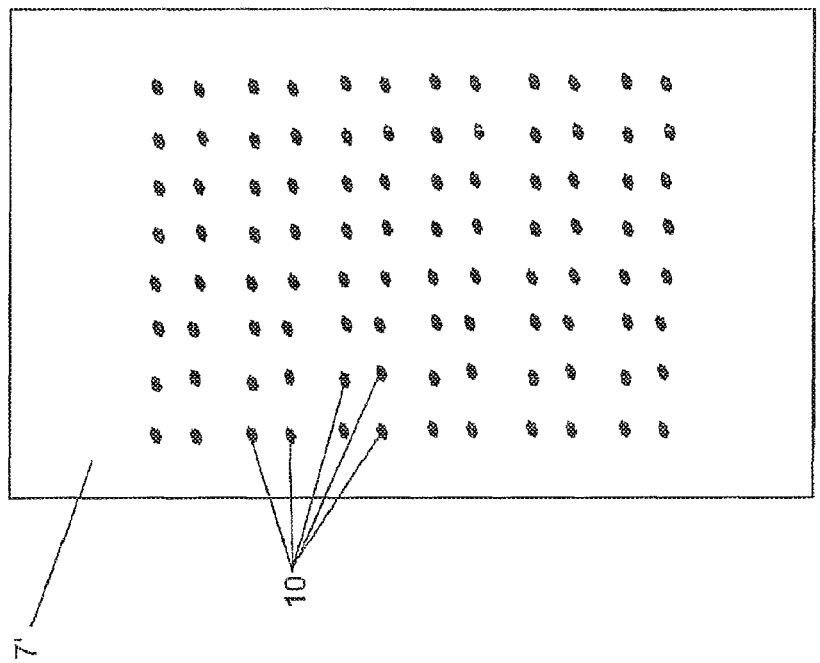
FIG. 4 is a simplified detail view of a windshield cover of the safety device.

The windshield cover 7, 7' is made of a transparent plastic foil, so that the driver can still see the road lane through the windshield cover 7' even when the airbag 6' is unfolded, so that, if desired, the driver can bring the vehicle to a standstill in a coordinated manner upon impact with a person such as a pedestrian or bicyclist. Numerous sharp-edged corundums 10 are affixed on the windshield cover and, in particular, on the side of the windshield cover 7' that faces the windshield 2 in the unfolded state, as shown in schematic form on the detail of the windshield cover 7' depicted in FIG. 4. The corundums 10 are arranged at relatively regular intervals of approximately 2.5 cm from each other. They exhibit a grain size between 1.6 mm and 2.3 mm. That is, the diameters of the corundums 10 range between 1.6 mm and 2.3 mm. The corundums 10 are distributed over the entire surface of the windshield cover 7, 7', so that only a peripheral strip of approximately 5 cm from the free legs 8 and the connecting leg 9 does not have any corundums.

If at this point a person, such as a pedestrian or a bicyclist, collides with the motor vehicle, the pedestrian or the bicyclist can hit his head either on the airbag 6', which intercepts the impact in a biomechanically acceptable fashion, or on the region between the two free legs 8 of the airbag 6'. In this region the head hits first the stretched windshield cover 7' that absorbs a small portion of the impact energy. Then, the impacting head presses the windshield cover 7' against the windshield 2. In so doing, the corundums 10 penetrate locally into the windshield 2 and cause initial damage to the windshield. The result of this action is that the windshield 2 loses its rigidity in these regions that experience the initial damage, so that, subsequently, the windshield breaks locally due to the impacting head and gives way. Due to the prior damage caused by the corundums 10, the rigidity of the windshield 2 is so low in any case that major head injuries can be avoided.

In contrast to an airbag that completely covers the surface so that it covers not only the "A" pillars and the bottom wind deflector, but also the entire front windshield, the invention has the advantage that the requisite airbag 6 may be made smaller. In the unactivated basic state, in which the airbag is folded up, the airbag requires less installation space and also needs less gas to unfold. Furthermore, the invention provides that the visibility of the road lane is largely retained for the driver even when the airbag is deployed, whereas an airbag that extends over the whole area would block the driver's view.

In addition, the invention provides that the corundums 10 cause prior damage to the windshield 2, only when a person, such as a pedestrian or a bicyclist, has actually crashed against the windshield cover T and, in so doing, has collided with the windshield 2. In the event of an unintentional opening, the unfolded windshield cover 7' is spaced apart from the windshield 2, so that the corundums 10 cannot cause any damage to the windshield. As a result, the full rigidity of the vehicle body, to which the windshield 2 makes a substantial contribution, is maintained.

The invention ensures that the windshield 2 will always yield reliably and sufficiently in the event of an impacting head of a pedestrian or a bicyclist even in the case of slight fluctuations in manufacturing parameters.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle safety device for protecting a person that collides with a motor vehicle, the safety device comprising:
   an airbag operatively arrangeable on a vehicle body of the motor vehicle such that in a non-activated state the airbag is folded-up and in an activated unfolded state the airbag at least partially covers a frame around a windshield of the motor vehicle, and
   a windshield cover, wherein:
      the airbag is configured such that, in the activated unfolded state, the windshield cover is stretched out in front of the windshield,
      the windshield cover has a region in which a plurality of energy dissipators are distributed on a side of the windshield cover facing the windshield, and
      the region is pressable against the windshield and causes prior damage to the windshield when the person collides with the region of the windshield cover.

2. The motor vehicle safety device according to claim 1, wherein the airbag is configured in a U-shape.

3. The motor vehicle safety device according to claim 1, wherein the windshield cover is made of at least one of a transparent and translucent material.

4. The motor vehicle safety device according to claim 1, wherein the windshield cover is made of a woven fabric of which a cover of the airbag is made.

5. The motor vehicle safety device according to claim 1, wherein the windshield cover has a plurality of holes or at least one recess formed therein.

6. The motor vehicle safety device according to claim 1, wherein the plurality of energy dissipators are arranged on the windshield cover in a predetermined pattern.

7. The motor vehicle safety device according to claim 1, wherein the plurality of energy dissipators are arranged on a side of the windshield cover facing the windshield at least in a peripheral region of the windshield cover.

8. The motor vehicle safety device according to claim 1, wherein the plurality of energy dissipators are arranged on the windshield cover in a defined manner such that when the windshield cover is stretched out in front of the windshield, a large number of the plurality of energy dissipators is provided in areas of the region of the windshield cover that come to rest in front of rigid regions of the windshield.

9. The motor vehicle safety device according to claim 1, wherein the airbag is configured to at least partially cover "A" pillars of the motor vehicle as a lateral boundary of the windshield and a bottom wind deflector of the motor vehicle as a lower boundary of the windshield.

10. The motor vehicle safety device according to claim 9, wherein the airbag is configured in a U-shape.

11. The motor vehicle safety device according to claim 1, wherein the windshield cover comprises a net or a foil.

12. The motor vehicle safety device according to claim 11, wherein the windshield cover is made of at least one of a transparent and translucent material.

13. The motor vehicle safety device according to claim 1, wherein the plurality of energy dissipators are arranged on the windshield cover at regular intervals.

14. The motor vehicle safety device according to claim 13, wherein the plurality of energy dissipators are arranged on the windshield cover at distances of approximately 1 cm to 4 cm with respect to one another.

15. The motor vehicle safety device according to claim 1, wherein the plurality of energy dissipators are granular material.

16. The motor vehicle safety device according to claim 15, wherein grains of the granular material comprise at least one sharp corner or edge.

17. The motor vehicle safety device according to claim 15, wherein grains of the granular material have a diameter substantially between 0.5 mm and 2.5 mm.

18. The motor vehicle safety device according to claim 15, wherein the granular material comprises a man-made abrasive grain material.

19. The motor vehicle safety device according to claim 15, wherein the granular material comprises a naturally occurring abrasive grain material.

20. The motor vehicle safety device according to claim 19, wherein the naturally occurring abrasive grain material is quartz, corundum, or a lubricating gel.

* * * * *